Figure 1:
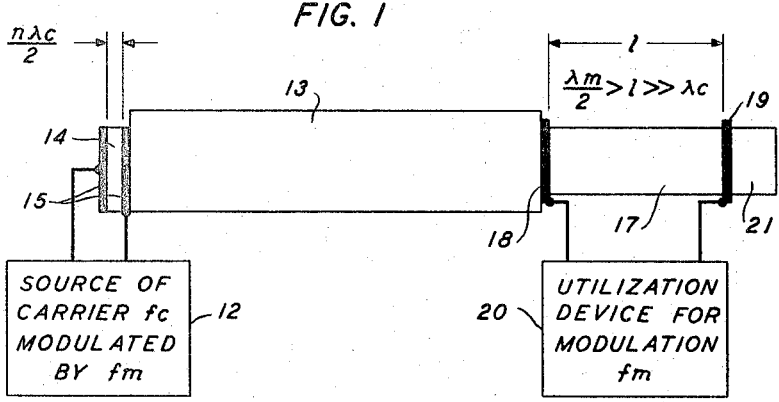

May 2, 1967  D. L. WHITE  3,317,847

ULTRASONIC WAVE DETECTOR

Filed May 31, 1962

INVENTOR
D. L. WHITE
BY
ATTORNEY

United States Patent Office 3,317,847
Patented May 2, 1967

3,317,847
ULTRASONIC WAVE DETECTOR
Donald L. White, Mendham, N.J., assignor to Bell Telephone Laboratories, Incorporated, New York, N.Y., a corporation of New York
Filed May 31, 1962, Ser. No. 199,178
6 Claims. (Cl. 329—198)

This invention relates to acoustic wave transmission devices and more particularly to devices by means of which the modulating signal upon a modulated ultrasonic, acoustic wave may be directly detected.

Ultrasonic devices, such as delay lines, take advantage of the fact that the velocity of propagation of a mechanical vibration or an acoustic wave is much lower than that of an electrical signal by transforming the electrical signal into an ultrasonic wave, sending the ultrasonic wave down a mechanical path of predetermined length and composition, and reconverting the wave into an electrical signal at the far end. Usually the ultrasonic wave is modulated with some intelligence which is to be ultimately detected after the desired delay has been introduced. The practice heretofore in such a case has been to convert the modulated ultrasonic wave into a similarly modulated electrical signal at the far end of the delay line, heterodyne the electrical signal with a local oscillator signal, and then detect the difference frequency.

It is, therefore, an object of the present invention to simplify and improve means for detecting the modulation upon an ultrasonic wave.

It is a further object to detect directly a modulated ultrasonic or acoustical wave.

In accordance with the invention, it has been discovered that an ultrasonic wave passing through a plate of piezoelectric semiconductive material of suitable conductivity, orientation and dimensions will produce a direct-current voltage across the faces of the plate that is proportional to the envelope of ultrasonic wave. In particular, the present invention makes use of the properties of materials that are not only semiconductive but that also would be piezoelectric if in high resistivity form. It is only recently that piezoelectric effects have been observed in a number of the materials here contemplated because they are generally too conductive to support the electric field usually associated with a piezoelectric response. However, if the material is sufficiently pure so as to have few current carriers or if the current carriers have been compensated by known doping techniques, the resistivity of the material may be increased so that a strong piezoelectric field can be supported. An ultrasonic wave applied to such a material will produce an alternating electric field that follows the frequency of the ultrasonic wave.

If, however, the resistivity of the material is decreased by increasing the electron concentration, the piezoelectric response begins to be shorted out and to be replaced by a bunching of the electron concentration and internal electrical currents in response to the strain produced by the ultrasonic wave. The electron bunching and the internal currents are periodic in lengths corresponding to both the carrier frequency and the modulation frequency. When suitable electrodes are connected to the material and spaced along the direction of propagation of the ultrasonic wave by an amount that is small compared to the wave length of modulating signal but large compared to the wave length of the carrier signal, a single modulation period will be embraced between the electrodes and a direct-current will be produced therein that corresponds to the modulation. This electrode spacing, however, embraces several carrier wave periods which tend to cancel each other. Thus, the electrode spacing descriminates against any residual piezoelectric response at the carrier frequency so that the output follows the envelope of the carrier.

Figure 2:
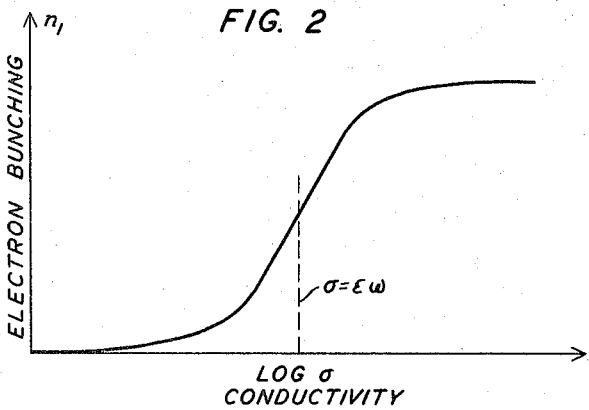
Figure 3:
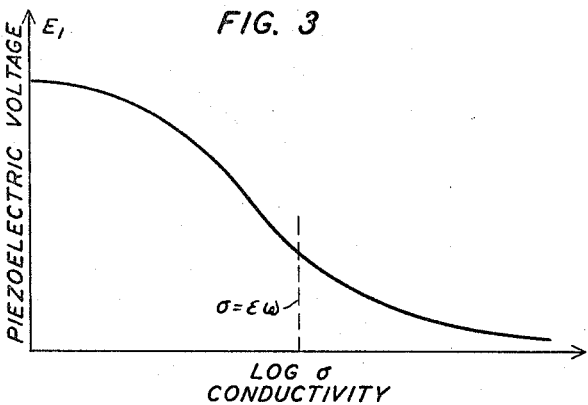

The above-mentioned objects, the nature of the present invention, its various advantages and features will appear more fully upon consideration of the following detailed description taken in connection with the drawings in which:

FIG. 1 is a schematic representation of an ultrasonic delay line including a transducer for launching a modulated ultrasonic wave upon the line at one end and a detector for the modulation in accordance with the invention at the other end; and FIGS. 2 and 3 are plots of how certain parameters of a piezoelectric-semiconductive material vary with the conductivity of the material and will be used in explaining the principles of the invention.

Referring more particularly to FIG. 1, an ultrasonic transducer of the piezoelectric type is represented by 14–15 which converts the modulated electrical signals from source 12 into acoustical vibrations which travel into ultrasonic delay line 13. Delay line 13 is conventional in all respects being formed from a material having known elastic wave transmission properties, for example, from an isotropic single crystal material or from a polycrystalline material having a grain size that is small compared to the wavelength of the elastic wave to be transmitted. Source 12 is represented as producing a high frequency carrier signal of frequency $f_c$ which has been modulated by a lower frequency modulating signal $f_m$. The form of modulation may be any that varies the envelope of the carrier signal as a function of the modulation. It may be simple amplitude modulation or in a system containing digital information, the carrier may be modulated to form a series of pulses in which case $f_m$ is then a function of the repetition rate. Transducer 14–15 may be a depletion layer transducer as described in my copending application Ser. No. 64,808, filed Oct. 25, 1960, or an epitaxial transducer as described in my copending application Ser. No. 147,283, filed Oct. 24, 1961, or any other suitable transducer. Regardless of its particular form, the transducer will include a layer of high resistivity piezoelectric material 14 suitably contacted by low resistance contacts 15, and will be substantially tuned to the high frequency signal $f_c$ by having the thickness of the piezoelectric element 14 generally equal to a small multiple of carrier frequency one-half wave lengths or $n\lambda_c/2$ where $n$ is as small an integer as possible, preferably unity. Such a transducer is suitably bonded to ultrasonic delay medium 13.

In accordance with the present invention, a detector for the modulation frequency $f_m$ is located at the other end of delay line 13. The detector comprises a block 17 of piezoelectric semiconductive material preferably from Group II–VI such as cadmium sulfide, cadmium selenide, zinc sulfide and others or, alternatively, from Group III–V such as gallium arsenide, indium antimony, indium arsenide and others. A face of block 17 that is substantially normal to any piezoelectric axis of the material is provided with a suitable low resistance contact 18, such as by a layer of evaporated indium. Contact 18 is then bonded to delay line 13. Block 17 has dimensions normal to the direction of propagation along line 13 that are comparable to those of line 13 and has a dimension $l$ parallel to this direction of propagation that is small compared to the wavelength of the modulation frequency and less than one-half wavelength thereof but very large compared to the carrier wavelength. The face of block 17 parallel to and spaced $l$ from the face bearing contact 18 is provided with a low resistance contact 19 similar to contact 18. Contacts 18 and 19 are connected to the device 20 for utilizing the modulation frequency $f_m$.

It is desirable to avoid reflections or ultrasonic standing waves back through block 17. Therefore, unless all incident energy can be absorbed in the material of block 17, an additional member of acoustical damping material 21 is included beyond electrode 19 which will dissipate all energy passing through block 17 and prevent reflection.

The parallelism of the faces supporting electrodes 18 and 19 need not be held to the extreme tolerances that are necessary in transducers such as 14–15. In the latter, the deviation from parallelism and the flatness of the faces should be small compared to the carrier wavelength. In the present detector the parallelism need only be small compared to the modulation wavelength.

The conductivity of block 17 is of particular importance with respect to the present invention. In general, the preferred conductivity is one that lies substantially midway between the low conductivity for which the material exhibits its maximum piezoelectric response to the carrier frequency $f_c$ and the higher conductivity for which maximum electron bunching is known to take place for the frequency $f_c$. The simplified analysis of this conductivity requirement which follows will also serve to illustrate the principles upon which the present invention depends.

Thus, the current in a semiconductor is known to be:

$$J = \sigma E \quad (1)$$

when $\sigma$ is the conductivity and $E$ is the applied voltage. When the material is both piezoelectric and semiconductive and when the material is subjected to the periodic strain produced by an ultrasonic wave propagating through it, $\sigma$ becomes:

$$\sigma = qM(n_0 + n_1 \sin \theta) \quad (2)$$

where $\theta$ is an angle dependent upon the frequency $f_c$ of the ultrasonic energy, $q$ is the electronic charge in coulombs, $M$ is the mobility thereof in cm.²/volt sec., $n_0$ is the average electron concentration per cm.³, $n_1$ is the magnitude of the electron bunching per cm.³ caused by strain upon the piezoelectric property and is:

$$n_1 = \frac{es}{qv\epsilon} \frac{\sigma}{\sqrt{\omega^2 + \frac{\sigma^2}{\epsilon^2}}} \quad (3)$$

where $e$ is the piezoelectric constant in coulombs per cm.², $s$ is the strain, $\epsilon$ is the permittivity in farads per cm. ($8.85 \times 10^{-14} \times$ dielectric constant), $v$ is the velocity of sound in the material, and $\omega$ is the angular frequency of the ultrasonic carrier $f_c$.

Likewise, when the material is both piezoelectric and semiconductive and subjected to the strain of an ultrasonic wave, E becomes:

$$E = E_0 + E_1 \sin \theta \quad (4)$$

where $E_0$ is any direct-current bias either applied or generated, $E_1$ is the piezoelectrically induced voltage caused by strain and is:

$$E_1 = -\frac{es}{\epsilon} \frac{1}{\sqrt{\omega^2 + \frac{\sigma^2}{\epsilon^2}}} \quad (5)$$

Substituting Equations 2 and 4 in 1 and expanding:

$$J = (n_0 E_1 + E_0 M_1) qM \sin \theta + \tfrac{1}{2} n_1 E_1 qM \sin 2\theta + qM n_0 E_0 + \tfrac{1}{2} qM n_1 E_1 \quad (6)$$

In Equation 6 the first term represents alternating current at the ultrasonic wave frequency, the second term represents harmonics thereof, and the third term represents direct-current factors dependent upon bias and load. It is only the final term with respect to which the present invention is concerned. This term represents a direct-current which depends upon the ultrasonically produced strain as it affects the product of $n_1$ defined by Equation 3, and $E_1$ defined by Equation 5. In accordance with the invention, the conductivity of the material is selected to optimize the product of $n_1 E_1$. FIG. 2 shows the plot of Equation 3 or $n_1$ as a function of the logarithm of the conductivity $\sigma$, and FIG. 3 shows the plot of Equation 5 or $E_1$ as a similar function. It will be seen that for low conductivities (small electron concentrations) there is little electron bunching and a substantial piezoelectric voltage. This is the relationship preferred for piezoelectric transducer materials such as 14 in FIG. 1. However, the product of $n_1 E_1$ is small and there would be no substantial direct-current component in Equation 6. On the other hand high conductivities will produce large electron bunching $n_1$ but the piezoelectric response $E_1$ will be substantially shorted out. Thus, the present invention depends upon a conductivity between these extremes. More particularly it may be shown from Equations 3 and 5 that the optimum of $n_1 E_1$ occurs when:

$$\sigma = \epsilon \omega \quad (7)$$

assuming that the frequency $\omega$ is not high enough to produce substantial carrier diffusion in the material. At higher frequencies when diffusion becomes significant, the optimum occurs at slightly higher conductivities. In either case, practical values of $n_1 E_1$ are obtained when $\sigma$ lies between $$0.05\ \epsilon\omega \text{ and } 10\ \epsilon\omega$$

Typically, Equation 7 means that the conductivity of the material 17 of the detector should have a conductivity several hundred times greater than the conductivity of the same or comparable material 14 of the transducer. In a typical embodiment employing cadmium sulfide for both the transducer and detector, for example, and designed to operate at a carrier frequency of 300 mc., the transducer material 14 should have a conductivity of no more than $10^{-6}$ ohm$^{-1}$ cm.$^{-1}$ while the detector material 17 should have a conductivity of $4 \times 10^{-5}$ ohm$^{-1}$ cm.$^{-1}$. The latter conductivity is obtained by doping a rather pure form of the material with conductive impurity atoms to the desired concentration.

Suitable doping materials are zinc, tin, sulfur, selenium and other materials familar to the art that have known usefulness in increasing the conductivity of compounds such as cadmium sulfide. It appears preferable that the impurity be of a donor material because of the greater mobility of electrons therein as opposed to holes, but an acceptor impurity would be satisfactory. In the case of materials such as cadmium sulfide which are also photoconductive, the resistivity can be altered by varying the illumination. Hence, the frequency at which the detector is most sensitive can be readily changed.

The foregoing mathematical analysis assumes that the carrier $f_c$ is continuous for simplicity. The effect of modulation of the carrier on the detector output is not, however, difficult to understand. Thus, so long as the carrier is continuous, the direct-current flowing between electrodes 18 and 19 and to device 20 is continuous. If the carrier is turned on and off slowly, the direct-current output will be similarly turned on and off. If the carrier is turned on and off rapidly as in a pulse train representing digital information, the output will be the integral of whatever carrier energy is within the length $l$ at the particular time. Thus, as a pulse arrives at the detector, the output rises rapidly to a maximum as the pulse enters the material of the detector, remains at this maximum as the pulse travels the length $l$ and drops to its minimum as the pulse leaves the detector. In order for the output to represent only a single pulse, the length $l$ should be less than the length occupied by the space between pulses or less than one-half the velocity of the pulses in the material divided by the maximum number of expected signal maxima per second (the repetition rate of the pulse). This distance may be considered as equivalent to one-half of the pulse "wavelength" in the material. Of course, if the length of a pulse is very short compared to the distance between them $l$ can be longer. In either case, each pulse will have left the length $l$ before a succeeding pulse enters it. In certain digital applications, however, it would be advantageous to sum several pulses in a succession or to continuously integrate over a particular length of time. In such a case the length $l$ would be increased as desired.

If the carrier signal is modulated by a sinusoidal function, the length $l$ should again be less than one-half the velocity of the wave in the material divided by the maximum number of expected signal maxima per second (the modulation frequency). This distance is of course one-half wavelength of the modulation frequency in the material. However, since the integral of the modulation along the length $l$ more nearly equals the instantaneous amplitude of the modulating signal when the length $l$ is small, it is preferable that $l$ be substantially less than one-half the modulation wavelength.

It should be noted that the detection provided by the present invention is that of a square law detector since the product of $n_1E_1$ depends upon $s^2$. Therefore, the invention has both the advantages and disadvantages familiar to the art for other square law detectors. For example, it is favorably adapted for detection of digital information but its output should be linearized by known circuit techniques for detecting sinusoidal modulation. On the other hand, the square law nonlinearity would have advantages in a parametric amplifier wherein an ultrasonic pump signal would be mixed in the detector with the modulation signal to produce an amplified output. More generally, any two ultrasonic signals could be mixed in the detector.

By suitably applying a direct-current bias between electrodes 18 and 19, gain may be produced in the output as well as detection of the modulation in accordance with the principles described in my copending application Ser. No. 105,700, filed Apr. 26, 1961.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A detector for the modulation upon a modulated high frequency ultrasonic carrier signal comprising a body of piezoelectric semiconductive material having a conductivity that is in the order of magnitude of $\epsilon\omega$ where $\epsilon$ is $8.85\times10^{-14}\times$ the dielectric constant of said material and $\omega$ is the angular frequency of said high frequency signal, said conductivity falling between that for which maximum piezoelectric response to said high frequency signal is exhibited and that for which maximum electron bunching takes place, and a pair of electrodes contacting said body at locations spaced apart by an amount that is large compared to the wavelength of said high frequency signal but less than the velocity of said signal in said body divided by the maximum number of expected signal maxima per unit of time.

2. The detector according to claim 1 wherein said conductivity is in the range for which both a substantial piezoelectric response and a substantial degree of electron bunching takes place in said material at the frequency of said high frequency signal.

3. The detector according to claim 1 wherein said locations are spaced apart less than one-half wavelength of said modulation frequency.

4. The detector according to claim 1 including means for launching said modulated signal as elastic wave vibrations in said material and means for utilizing the modulation component of said signal connected to said electrodes.

5. In a system in which modulated high frequency elastic vibration waves are transmitted along an ultrasonic wave guiding path, a detector for the modulation components of said wave comprising a body of piezoelectric semiconductive material and a pair of electrodes contacting said body, said detector being characterized in that said material has a conductivity for which it exhibits a substantial piezoelectric response and a substantial degree of electron bunching at the frequency of said high frequency signal of such values that the product of said piezoelectric response and said electron bunching is substantially maximum, and in that said electrodes are spaced apart by an amount that is large compared to the wavelength of said high frequency signal but less than the wavelength of said modulation.

6. In combination, a source of a modulated high frequency signal, an ultrasonic delay line, means for launching said signal as elastic wave vibrations upon said line, means for utilizing the modulation component of said signal, and a detector for said modulation comprising a body of piezoelectric semiconductive material, said body being bonded to said line to receive elastic wave vibrations from said line, said material having a conductivity between that for which maximum piezoelectric response to said vibrations is exhibited and for which maximum electron bunching takes place of such value that the product of said piezoelectric response and said electron bunching is substantially maximum, and a pair of electrodes connected to said utilizing means and contacting said body at locations spaced apart by an amount that is nearer to the wavelength of said modulation frequency than to the wavelength of said carrier frequency.

References Cited by the Examiner

UNITED STATES PATENTS

| | | | |
|---|---|---|---|
| 2,791,759 | 5/1957 | Brown | 340—173 |
| 2,866,014 | 12/1958 | Burns | 179—110 |
| 2,989,477 | 8/1959 | Hoesterey | 333—72 |
| 3,093,758 | 6/1963 | Hutson | 310—8 |
| 3,145,354 | 8/1964 | Huston | 333—30 |
| 3,173,100 | 3/1965 | White | 330—35 |
| 3,184,683 | 5/1965 | Murray et al. | 329—198 |
| 3,185,935 | 5/1965 | White | 333—30 |
| 3,185,942 | 5/1965 | White | 333—30 |
| 3,234,488 | 2/1966 | Fair | 333—30 |

HERMAN KARL SAALBACH, *Primary Examiner.*

C. BARAFF, *Examiner.*